(12) United States Patent
Gan

(10) Patent No.: US 6,333,064 B1
(45) Date of Patent: Dec. 25, 2001

(54) VISCOSITY MODIFIER FOR THERMOSETTING RESIN COMPOSITION

(75) Inventor: Joseph Gan, Strasbourg (FR)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/370,656

(22) Filed: Aug. 6, 1999

(30) Foreign Application Priority Data

Aug. 14, 1998 (GB) .................................................... 9817799

(51) Int. Cl.[7] ............................ C08L 63/00; C08G 73/06
(52) U.S. Cl. ............................ 427/58; 428/413; 528/73; 525/449; 525/452; 525/453; 525/526; 525/528
(58) Field of Search ................................. 427/58; 428/413; 525/449, 452, 453, 526, 528; 528/73

(56) References Cited

U.S. PATENT DOCUMENTS

| | | | |
|---|---|---|---|
| 3,334,110 | 8/1967 | Schramm et al. | |
| 4,066,628 | 1/1978 | Ashida et al. | 260/77.5 R |
| 4,070,416 | 1/1978 | Narahara et al. | 260/830 |
| 4,564,651 | 1/1986 | Markert et al. | 524/589 |
| 4,631,306 | 12/1986 | Markert et al. | 523/457 |
| 4,912,172 | 3/1990 | Hallgren et al. | |
| 4,920,164 | 4/1990 | Sasaki et al. | |
| 5,066,735 | 11/1991 | Walker et al. | 525/482 |
| 5,112,932 | 5/1992 | Koenig et al. | 528/51 |
| 5,308,565 | 5/1994 | Weber et al. | |
| 5,314,720 | 5/1994 | Gan et al. | 427/386 |
| 5,317,067 * | 5/1994 | Yagi . | |
| 5,449,737 | 9/1995 | Uchida et al. | 528/73 |
| 5,480,958 * | 1/1996 | Starner . | |
| 5,545,697 | 8/1996 | Uchida | 525/403 |

FOREIGN PATENT DOCUMENTS

| | | |
|---|---|---|
| 0 133 575 A1 | 2/1985 | (EP) . |
| 0 296 450 B1 | 12/1988 | (EP) . |
| 0 318 325 A2 | 5/1989 | (EP) . |
| 0 695 316 B1 | 2/1996 | (EP) . |
| 458502 | 12/1936 | (GB) . |
| 1037895 | 8/1966 | (GB) . |
| 1042855 A | 9/1966 | (GB) . |
| 1370782 A | 10/1974 | (GB) . |
| 189173 * | 10/1984 | (JP) . |
| 143244 * | 6/1997 | (JP) . |
| 94/11415 | 5/1994 | (WO) . |
| 95/21879 | 8/1995 | (WO) . |
| 96/12751 | 5/1996 | (WO) . |
| 98/01041 | 1/1998 | (WO) . |
| 98/18845 | 5/1998 | (WO) . |
| 98/44017 | 8/1998 | (WO) . |

OTHER PUBLICATIONS

Delmonte, et al., "Fiber–Reinforced Epoxy Composites", Epoxy Resin Chemistry and Technology, 2$^{nd}$ Ed., pp. 885–928, (1998).
Lee, et al., "Synthesis of Glycidyl—Type Epoxy Resins", Handbook of Epoxy Resins , pp. 2.1 to 3–24, (1967).
"Epoxy Resins", Encyclopedia of Poly. Sci. & Eng., vol. 6, pp. 348–356, (1986).
Mika, et al., "Curing Agents and Modifiers", C.A. Epoxy Resins, 2$^{nd}$ Ed., pp. 465–512, (1988).
WPI Abstract Accession No. 95–299775[39] & JP 070197000 A (Shinetsu) Aug. 1, 1995 see abstract.
WPI Abstract Accession No. 89–319250[44] & JP 010236226 A (Sumitomo Bakelite) Sep. 21, 1989 see abstract.
WPI Abstract Accession No. 80–19359C[11] & JP 550015870 A (Toho Beslon) Feb. 04, 1980 see abstract.
WPI Abstract Accession No. 94–198587[24] & SU 1807059 A1 (Lengd Elektrosila) Apr. 07, 1993 see abstract.
WPI Abstract Accession No. 97–347515[32] JP 090143244 A (Mitsubishi Rayon) Jun. 03, 1997 see abstract.
WPI Abstract Accession No. 93–309237[44] & JP 050222160 A (Ciba Geigy) Aug. 31, 1993 see abstract.

* cited by examiner

Primary Examiner—David J. Buttner

(57) ABSTRACT

A heat curable thermosetting epoxy resin formulation useful for making prepregs and electrical laminates containing a viscosity modifier, wherein the viscosity modifier is:

(a) an optionally substituted polymer of a monovinylidene aromatic monomer, optionally having one or more further unsaturated monomers copolymerized therewith;

(b) an optionally substituted polyphenylene oxide; or (c) an oxazolidone ring-containing compound.

25 Claims, 6 Drawing Sheets

Figure 1 Geltime approximately 120 s

Figure 2 — Geltime approximately 150 s

Figure 3 Geltime approximately 170 s

VISCOSITY MODIFIER FOR THERMOSETTING RESIN COMPOSITION

BACKGROUND OF THE INVENTION

This invention relates to resin formulations, and in particular to curable thermosetting resin formulations such as epoxy resins. In particular embodiments, the invention relates to resin formulations useful for making prepregs and electrical laminates.

It is known to make prepregs, electrical laminates and other composites from a fibrous substrate and an epoxy-containing matrix resin. Such processes usually contain the following steps:

(1) an epoxy-containing formulation is applied to a substrate by rolling, dipping, spraying, other known techniques and/or combinations thereof. The substrate is typically a woven or nonwoven fiber mat containing, for instance, glass fibers or paper.

(2) The impregnated substrate is "B-staged" by heating at a temperature sufficient to draw off solvent in the epoxy formulation and optionally to partially cure the epoxy formulation, so that the impregnated substrate can be handled easily. The "B-staging" step is usually carried out at a temperature between 90° C. and 210° C. and for a time between 1 minute and 15 minutes. The impregnated substrate that results from B-staging is called a prepreg. The temperature is most commonly 100° C. for composites and 130° C. to 180° C. for electrical laminates.

(3) One or more sheets of prepreg are stacked in alternating layers with one or more sheets of a conductive material, such as copper foil, if an electrical laminate is desired.

(4) The laid-up sheets are pressed at high temperature and pressure for a time sufficient to cure the resin and form a laminate. The temperature of lamination is usually between 100° C. and 230° C., and is most often between 165° C. and 190° C. The lamination step may also be carried out in two or more stages, such as a first stage between 100° C. and 150° C. and a second stage at between 165° C. and 190° C. The pressure is usually between 50 N/cm$^2$ and 500 N/cm$^2$. The lamination step is usually carried on for 10 to 500 minutes, and most often for 45 to 300 minutes. The lamination step may optionally be carried out at higher temperatures for shorter times (such as in continuous lamination processes) or for longer times at lower temperatures (such as in low energy press processes).

(5) Optionally, the resulting copper-clad laminate may be post-treated by heating for a time at high temperature and ambient pressure. The temperatures of post-treatment are usually between 120° C. and 250° C. The post-treatment time usually is between 30 minutes and 12 hours.

Electrical laminates and processes by which they are made, are described in greater detail in numerous references, such as U.S. Pat. No. 5,314,720 (May 24, 1994) and Delmonte, Hoggatt & May; "Fiber-reinforced Epoxy Composites," *Epoxy Resins, Chemistry and Technology* (2d Ed.) at 889–921 (Marcel Dekker, Inc. 1988).

The formulations that are used in such processes typically contain:

(1) an epoxy resin;
(2) a curing agent, for example a polyamine such as dicyandiamide, a polyanhydrides such as a styrene/maleic anhydride copolymer, or a polyphenol or a mixture of two or more curing agents;
(3) a catalyst to promote the reaction of the resin and the curing agent, such as 2-methylimidazole, 2-ethyl, 4-methylimidazole, 2-phenylimidazole, or a mixture of two or more catalysts; and
(4) optionally, from 0 to 50 weight percent of a volatile organic solvent such as a ketone, a glycol ether, dimethylformamide, xylene or a mixture of two or more organic solvents.

Viscosity is critical in laminate making processes. See, for example, Delmonte, Hoggatt & May at 903. High viscosity resins distort the position of fibers in the substrate, and are difficult to impregnate into the substrate. However, if the viscosity of the resin is too low, the resin tends to flow out of the prepreg stack during the lamination process, resulting in a laminate which is deficient in resin, such that it is very difficult to obtain a homogeneous thickness over the whole laminate. The ability to control the thickness of laminates is important in some applications. For example, recently, a new chip memory module technology has been developed to achieve faster bus/substrate speed (>300 MHz) to better utilize the capabilities of faster CPUs. The critical need in this application is for extremely tight control of the dielectric constant which translates into much better thickness control of the laminate layers.

Formulations which contain liquid epoxy resins and a chain extender have not commonly been used in laminating processes, because their viscosity in the treater and prepreg is often too low. The formulations run and drip in the treater before the B-stage is complete. Furthermore, the formulations flow too much after the prepreg is put into the laminating press. The resin is forced out of the laminate and into the press, and the resulting laminate is too thin.

Extra catalysts may be added to the formulation to encourage quick reaction of epoxy resin and chain extender in the treater, so that higher molecular weight advanced resins are produced before dripping occurs. However, those catalysts also accelerate curing of the resin with the curing agent. It is difficult to prevent the viscosity from building too high for effective lamination. Moreover, formulations which contain too much catalyst have a short shelf- or pot-life, and the resulting prepregs have a short shelf-life.

It is known to incorporate thermoplastic resins in electrical laminate formulations to reduce the resin flow out (waste) by increasing the melt viscosity of the B-staged materials of the prepregs during the lamination process. A high molecular weight polymer obtained by an advancement reaction using bisphenol-A and the diglycidylether of bisphenol-A and is sold commercially by Phenoxy Associates (USA), under the trademark PKHH. This material is frequently used to reduce resin flow-out by increasing the melt viscosity of the B-staged materials without shortening the gel time. However, when PKHH is used, the Tg of the resulting laminate is adversely affected. In the case of acid anhydride cured systems (for example as disclosed in PCT/US98/01041), the secondary hydroxyl groups present in PKHH react easily at room temperature with the acid anhydride to generate acid groups in the presence of amine catalysts. These acid groups react with the epoxy groups and the pot-life/gel time of the formulations are considerably reduced and is not desirable.

There are three end products (conventionally referred to as polyoxazolidones) which can be obtained in the condensation reaction of polyisocyanates with polyfunctional epoxides, namely isocyanate-terminated polyoxazolidones, linear polyoxazolidones, and epoxy-terminated polyoxazolidones. These three possible end products and various methods for their production, are described in U.S. Pat. No. A 5,112,932 and in the references referred to therein, all of which are incorporated herein by reference. Epoxy terminated polyoxazolidones are prepared by reacting an epoxy resin with a polyisocyanate compound using stoichiometric excess of epoxy resin (isocyanate/epoxide ratio lower than 1).

U.S. Pat. No. A 4,070,416 (Hitachi) describes a process for producing thermosetting resins by mixing one equivalent or more of polyfunctional isocyanate per one equivalent of a polyfunctional epoxide in the presence of a tertiary amine, morpholine derivatives or imidazole as catalysts. The catalyst is used within a range of 0.1 to 2 weight percent, based on the combined weight of the reactants. The reaction temperature of 130° C. or lower is said to result in the formation of mainly isocyanurate rings, whereas it is assumed that oxazolidone rings should be mainly formed at temperature above 130° C. The resins produced are said to exhibit excellent electrical and mechanical properties and high thermal stability. They are said to have various applications as heat resistance insulation varnishes, casting resins, impregnation resins, molding resins for electrical parts, adhesives, resins for laminating boards, resins for printed circuits etc.

EP A 0,113,575 discloses powder coating compositions comprising epoxy terminated polyoxazolidone resins prepared by reacting a diepoxide and a diisocyanate in amounts which provide a ratio of epoxide equivalents to isocyanate equivalents of from 1.1:1 to 10:1 and curing agents. The polyoxazolidone resins are said to have comparatively high glass transition temperatures and provide coatings of improved resistance to cathodic disbandment. The coating compositions are applied by fluidized bed sintering or electrostatic spray methods.

Self thermosetting compositions of polyisocyanates and polyepoxides are described in U.S. Pat. No. A 4,564,651 (Markert) and U.S. Pat. No. A 4,631,306 (Markert) which disclose a method for the preparation of reaction resin molded materials and molded materials for insulating components, respectively containing oxazolidone and isocyanurate rings by mixing a polyepoxide and a polyisocyanate to from a resin mixture having a viscosity up to 7000 mpa·s at 25° C. and the mole ratio of epoxy to isocyanate groups of 1:1 to 5:1; reacting the resin mixture in the presence of an imidazole or tertiary amine catalyst at elevated gelling temperature of from 80° C. to 130° C. to form a cross linked polymer; and heating the cross linked polymer to 130° C. to 200° C. to cause post hardening and produce a molded material. The molded materials are reported to exhibit improved mechanical properties.

U.S. Pat. No. A 3,334,110 (Schramm) discloses a method for preparing epoxy terminated polyoxazolidones by reacting a polyisocyanate with a polyepoxide in the presence of a catalyst mixture comprising an alcohol and tertiary amine or a quaternary ammonium salt. The epoxy terminated polyoxazolidones can be cured with epoxy curing catalysts or reacted with epoxy hardeners to give a variety of products useful in the fields of coatings, laminating, bonding, molding, foams, etc.

U.S. Pat. No. A 4,066,628 (Ashida et. al.) discloses a process for preparing polyoxazolidones by reacting an organic isocyanate with an epoxide in the presence of dialkyl zinc, zinc carboxylate, organozinc chelate compound or trialkyl aluminum as the catalyst. Polyoxazolidones prepared by this process are useful starting materials for the manufacture of a wide variety of products including foams, coatings, adhesives, elastomers and the like.

Although numerous processes for the preparation of polyoxazolidones are described in the literature, there is no disclosure nor suggestion in the known art that epoxy terminated polyoxazolidones would be useful as viscosity-modifying additives, to be added in relatively small amounts to other resin compositions, in particular to heat curable thermosetting resins such as epoxy resins, in order to improve their viscosity properties, whilst maintaining an adequate Tg in the final cured resin.

EP B 0,695,316 and U.S. Pat. No. A 5,449,737 (CIBA) also disclose the preparation of oxazolidone-containing base resins.

Although both of these CIBA references refer in general terms to materials having an epoxy equivalent weight (EEW) of from 200 to 10,000, they are concerned with "base resins", intended to be cured with a crosslinking agent, and for such purposes, a material having a low EEW (for example no more than 500) would invariably be used. If a material with a high equivalent weight (in particular, higher than 500) is used as a base resin in the production of laminates, the resin fails to wet out the glass fibers, and is therefore unsatisfactory. All of the Examples in both of the CIBA patents use an amount of isocyanate of no more than 18.7% (TDI) for the preparation of the base resin, and result in materials having an EEW of no more than 500. In practice therefore, the skilled addressee following the teaching of these references would not prepare a material having a molecular weight of 5000 or more.

SUMMARY OF THE INVENTION

We have now discovered that certain low hydroxyl content high molecular weight resins are able to act as viscosity modifiers, and provide higher melt viscosity to the B-staged material at without adverse effect on varnish and prepreg gel times, pot-life and shelf-life.

We have also discovered certain new, oxazolidone-ring-containing materials having a molecular weight which is significantly higher than those envisaged in EP A 0,695,316 and U.S. Pat. No. A 5,449,737, which are useful as such viscosity modifiers.

We have also found that prepregs incorporating the viscosity modifiers exhibit better storage stability and higher laminate Tg than systems employing PKHH. In particular, we have found that the Tg of laminates obtained using PKHH exhibit lower Tg when the prepregs were stored over a period of time whereas prepregs prepared using the viscosity modifiers of the present invention exhibited a lower drop in laminate Tg after same period of storage.

Accordingly, in a first aspect of the present invention, there is provided the use as a viscosity modifier for a heat-curable thermosetting resin composition of a thermoplastic resin wherein the thermoplastic resin has a molecular weight of at least about 5000, and a hydroxyl content not exceeding about 0.2 hydroxyl equivalents per 100 g of the resin composition, and wherein the viscosity modifier is:

a) an optionally substituted polymer of a monovinylidene aromatic monomer, optionally having one or more further unsaturated monomers copolymerized therewith;

b) an optionally substituted polyphenylene oxide; or c) an oxazolidone ring-containing compound.

The viscosity modifier may be, for example, polystyrene, brominated polystyrene, a polyphenylene oxide, or a brominated polyphenylene oxide. Preferably however, the viscosity modifier is an oxazolidone ring-containing compound which is obtained by the reaction of:

a) a polyisocyanate having an isocyanate functionality of from about 1.9 to about 2.1;
b) a polyepoxide having an epoxide functionality of from about 1.9 to about 2.1, and optionally; and
c) a chain extender,
wherein the oxazolidone ring-containing compound has a molecular weight of at least about 5000.

In a second aspect of the present invention there is provided a thermosetting resin composition comprising a heat-curable thermosetting resin having a molecular weight of from about 200 to about 3000, and from about 0.5 to about 40 percent by weight, based on the resin composition, of a viscosity modifier which is a thermoplastic resin having a molecular weight of at least about 5000 and a hydroxyl content not exceeding about 0.2 hydroxyl equivalents per 100 g of the resin composition, wherein the viscosity modifier is:
 a) an optionally substituted polymer of a monovinylidene aromatic monomer and optionally one or more further unsaturated monomers copolymerized therewith;
 b) an optionally substitute polyphenylene oxide; or
 c) an oxazolidone ring-containing compound.

In a further aspect of the present invention there is provided a method of preparing a thermosetting resin composition, which method comprises combining a heat-curable thermosetting resin having a molecular weight of from about 200 to about 3000, with from about 0.5 to about 40 percent by weight, based on the resin composition, of a viscosity modifier wherein the viscosity modifier is a thermoplastic resin having a molecular weight of at least about 5000 and a hydroxyl content not exceeding about 0.2 hydroxyl equivalents per 100 g of the resin composition, wherein the viscosity modifier is:
 a) an optionally substituted polymer of a monovinylidene aromatic monomer and optionally one or more further unsaturated monomers copolymerized therewith;
 b) an optionally substituted polyphenylene oxide; or
 c) an oxazolidone ring-containing compound.

The thermosetting resin composition is preferably an epoxy resin composition, and may preferably also comprise a hardener for the epoxy resin and/or an organic solvent. Optionally, the composition may also comprise one or more pigments, fillers, stabilizers or other conventional epoxy resin additives.

The amount of the oxazolidone ring-containing compound in the epoxy resin composition is preferably such as to provide from about 0.01 to about 1 equivalents of oxazolidone, preferably from about 0.02 to about 0.75 equivalents of oxazolidone, more preferably about 0.02 to about 0.5 equivalents of oxazolidone, per kilogram of resin. A third aspect of the present invention is a process for making a composite, particularly an electrical laminate, using an epoxy resin composition as described above.

In a fourth aspect of the present invention, there is provided a thermoplastic oxazolidone ring-containing compound having a molecular weight of at least about 5000, which is the reaction product of:
 a) from about 20 to about 43 weight percent, based on the polyepoxide and polyisocyanate reactants, of a polyisocyanate having an isocyanate functionality of from about 1.9 to about 2.1;
 b) from about 80 to about 57 weight percent, based on the polyepoxide and polyisocyanate reactants, of a polyepoxide having an epoxide functionality of from about 1.9 to about 2.1; and optionally,
 c) a chain extender.

DETAILED DESCRIPTION OF THE INVENTION

Figure 1:
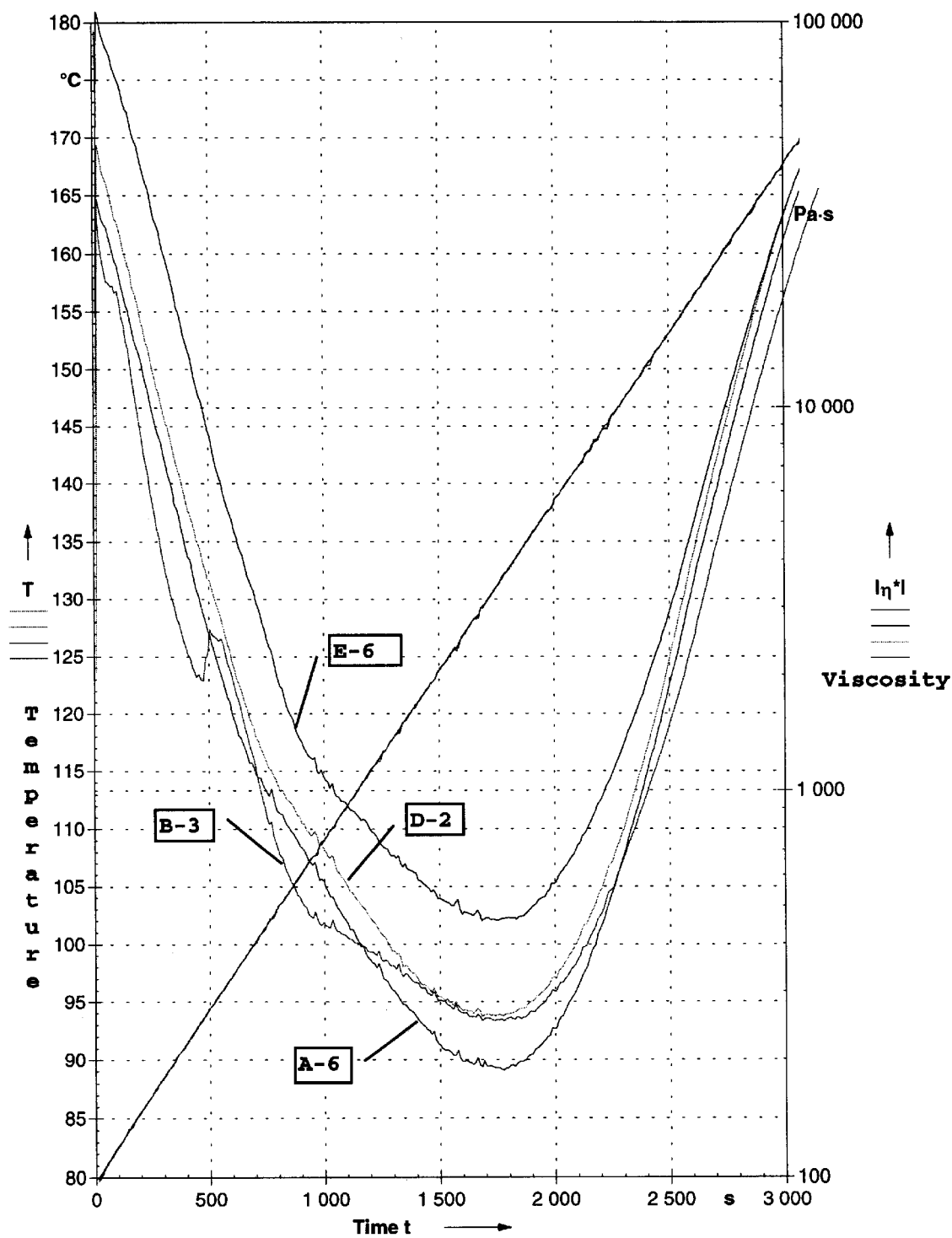
FIGS. 1–6 plot the viscosity of the B staged materials of the examples versus time on a constant rising temperature scale.

The polyepoxide compound useful in the preparation of the viscosity modifier is suitably a compound which possesses an average of from about 1.9 to about 2.1 1,2-epoxy groups per molecule. In general, the polyepoxide compound is saturated or unsaturated aliphatic, cycloaliphatic, aromatic or heterocyclic compound which possesses more than one 1,2-epoxy group. The polyepoxide compound can be substituted with one or more substituents which are non reactive with the isocyanate groups such as lower alkyls and halogens. Such polyepoxide compounds are well known in the art. Illustrative polyepoxide compounds useful in the practice of the present invention are described in the *Handbook of Epoxy Resins* by H. E. Lee and K. Neville published in 1967 by McGraw Hill, New York and U.S. Pat. No. 4,066,628 both incorporated herein by reference.

Examples of suitable aromatic polyepoxides are bisphenol-A, bisphenol-F, bisphenol-AD, bisphenol-S, tetramethyl bisphenol-A, tetramethyl bisphenol-F, tetramethyl bisphenol-AD, tetramethyl bisphenol-S, tetrabromobisphenol-A, tetrachlorobisphenol-A, biphenols such as 4,4'-biphenol or 3,3',5,5'-tetramethyl-4,4'-biphenol, and dihydroxynaphthalene.

Examples of suitable aliphatic polyepoxides are diglycidyl esters of hexahydrophthalic acid and diglycidyl esters of dicarboxylic acids, epoxidized polybutadiene, epoxidized soyabean oil, and epoxidized diols.

Cycloaliphatic epoxides include, for example, 3,4-epoxy-6-methylcyclohexyl carboxylate and 3,4-epoxycyclohexyl carboxylate.

Preferred polyepoxides are glycidyl compounds of bisphenol-A, of bisphenol-F, of tetrabromobisphenol-A and of 3,3',5,5'-tetramethyl-4,4-biphenol. Mixtures of any two or more polyepoxides can also be used in the practice of the present invention.

The polyisocyanate compound useful in the practice of the present invention may be represented by the following general formula:

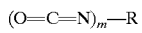

wherein R is substituted or unsubstituted aliphatic, aromatic or heterocyclic polyvalent group and m has an average value of from about 1.9 to about 2.1. Examples of suitable polyisocyanates are the difunctional isocyanate disclosed in WO A 9,521,879 incorporated herein by reference. Preferred examples are 2,4'-methylene bis(phenylisocyanate) and 4,4'-methylene bis(phenylisocyanate) (MDI) and isomers thereof, higher functional homologs of MDI (commonly designated as "polymeric MDI" ), toluene diisocyanate (TDI) such as 2,4-toluene diisocyanate and 2,6-toluene diisocyanate, m-xylylene diisocyanate, hexamethylene diisocyanate (HMDI) and isophoronediisocyanate. Particularly preferred polyisocyanates are 2,4'-methylene bis(phenylisocyanate) and 4,4'-methylene bis(phenylisocyanate). Mixtures of any two or more polyisocyanates can also be used.

A suitable catalyst may be employed to facilitate reaction of the polyepoxide compound with the polyisocyanate compound. Examples of suitable catalysts include zinc carboxylate, organozinc chelate compound, trialkyl aluminum, quaternary phosphonium and ammonium salts, tertiary amines and imidazole compounds. The preferred catalysts are imidazole compounds and azo compounds. Particularly, preferred catalysts are 2-phenylimidazole 2-methylimidazole, 1 methylimidazole, 2-methylimidazole, 4,4'-methylene methylimidazole), 1,5-diazabicyclo[4.3.0] non-5-en, 1,4-diazabicyclo[2.2.2] octane and 1,8-diazabicyclo[5.4.0] undec-7-en.

The catalyst is generally employed in an amount of from about 0.01 to about 2; preferably about 0.02 to about 1, most preferably about 0.02 to about 0.1, weight percent based on the combined weight of the polyepoxide compound and polyisocyanate compound used.

The polyisocyanate compound is generally employed in an amount of from about 15 to about 43, preferably about 20 to about 43, more preferably about 20 to about 40, most preferably about 25 to about 35, weight percent, based on the polyepoxide and polyisocyanate reactants.

The polyepoxide compound is generally employed in an amount of from about 85 to about 57, preferably about 80 to about 57, more preferably about 80 to about 60, most preferably about 75 to about 65, weight percent, based on the polyepoxide and polyisocyanate reactants.

The reaction of the polyepoxide with the polyisocyanate is usually conducted at a temperature of from about 100° C. to about 240° C., preferably from about 120° C. to about 230° C., more preferably from about 130° C. to about 220° C., most preferably from about 140° C. to about 210° C.

The polyoxazolidone-containing viscosity modifier can be produced via either a batch reactor or an extruder. The extrusion products exhibit lower polydispersity and lower gel particle content verses the batch reactor-produced materials. The resident time in an extruder depends on the temperature of the extrusion temperature, the size of the extruder and the catalyst levels.

In the production of oxazolidone ring-containing resins via batch reactor, the catalyst is usually added to the reaction vessel containing the polyepoxide prior to the start of the addition of polyisocyanate compound. The catalyst can be dissolved in a suitable solvent prior to the addition to the polyepoxide to improve homogenization if desired. The temperature at which the catalyst is added is not critical. In general the catalyst is added at a temperature lower than the reaction temperature. The temperature is then raised and the reaction temperature maintained while the controlled addition of the polyisocyanate to the mixture of the catalyst and the polyepoxide is started. The polyisocyanate addition time will depend on the physical characteristics of the reactor, e.g., stirrer size, and heat transfer characteristics, but usually, the polyisocyanate is added to the reaction vessel within a period of time of from about 3 to about 300, preferably about 5 to about 240, more preferably about 10 to about 180, most preferably about 20 to about 150 minutes, while maintaining the reaction temperature. The reaction temperature is maintained after the complete addition of the polyisocyanate for a period of time of from about 5 to about 180, preferably about 15 to about 120, most preferably about 30 to about 90 minutes.

In general, the reaction of the polyepoxide compound and the polyisocyanate compound is preferably conducted neat, that is, in the absence of a solvent or other liquid reaction diluent, although the reaction may be carried out in the presence of a polar solvent such as DMF, NMP and DMSO.

The optional chain extender employed in the production of the polyoxazolidone compound is one which is able to increase the molecular weight of the polyoxazolidone compound. Preferred chain extenders are dihydric phenols, halogenated dihydric phenols, dicarboxylic acids, diamines, aminoamides and alkanolamines.

Suitable dicarboxylic acid chain extenders are compounds of the formula

wherein R is a $C_{1-40}$ hydrocarbyl moiety optionally containing oxygen along the backbone, and u is from about 1.9 to about 2.1. Examples are succinic acid, glutaric acid, adipic acid, oxalic acid, phthalic acid, hexahydrophthalic acid, maleic acid, citraconic acid, itaconic acid, dodecenylsuccinic acid and alkylated endoalkylenetetrahydrophthalic acid, and half esters obtained from the reaction of a polyol with an acid anhydride.

The term hydrocarbyl as employed herein means any aliphatic, cycloaliphatic, aromatic, aryl substituted aliphatic or cycloaliphatic, or aliphatic or cycloaliphatic substituted aromatic groups.

Other suitable chain extenders useful in the practice of the present invention are diamines and aminoamides, i.e., amine- or amino amide-containing compounds having two N—H bonds capable of reacting with an epoxy group. Such compounds useful in the present invention include, for example, di-secondary amines of the general formula R—NH—R'—NH—R" wherein R, R' and R" are alkyl, cycloalkyl or aryl moieties; and heterocyclic di-secondary amines wherein one or both of the N atom is part of a nitrogen-containing heterocyclic compound such as:

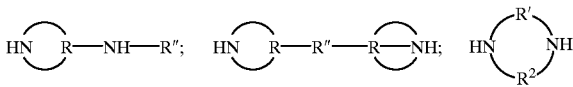

For reactivity reasons, and in order to control the epoxy advancement reaction with the di-functional amines more effectively, di-secondary amines or primary amines having sterically hindered amine groups are preferred as, for example, 2,6-dimethyl cyclohexylamine or 2,6-xylidene (1-amino-2,6-dimethylbenzene).

Amino amide-containing compounds useful as advancement monomers in the present invention include for example derivatives of carboxylic and amides as well as derivatives of sulfonic acid amides having additionally one primary or two secondary amino groups. Preferred examples of such compounds are amino-aryl carboxylic acid amides and amino-arylsulfonamides. A preferred compound of this group is, for example, sulphanilamide (4-amino benzylsulfonic acid amide).

Other suitable examples are piperazine and substituted piperazine such as 2-methyl piperazine, monoethanolamine, and piperidin-4-carbonic acid.

The chain extender is particularly preferably a phenolic compound, containing on average more than about 1 and less than about 3, preferably from about 1.8 to about 2.2 and more preferably about 2 active hydrogen (e.g., phenolic hydroxyl) groups per molecule.

The most preferred chain extenders are dihydroxy phenols. Non-limitative examples of the phenol compounds are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis(4-hydroxyphenyl) methane; 1,1-bis(4-hydroxyphenyl)-1-phenyl ethane; 1'bis(2,6-dibromo-3,5-dimethyl-4-hydroxyphenyl) propane; bis(4-hydroxyphenyl) sulfone; bis(4-hydroxyphenyl) sulfide;

resorcinol, hydroquinone, tetramethylbisphenol-A, tetramethylbisphenol-AD and tetramethylbisphenol-S. Preferred dihydroxy phenolic compounds are 2,2-bis(4-hydroxyphenol) propane (bisphenol-A), and 2,2-bis(4-hydroxy-3,5-dibromophenyl) propane.

When the phenolic chain extender is non-halogenated, its molecular weight is preferably at least about 110 and more preferably at least about 185. The molecular weight is preferably no more than about 800, more preferably no more than about 500, and most preferably no more than about 250. For halogenated phenolic chain extenders, the formula weight of non-halogen atoms in the chain extender preferably meets the foregoing preferred limitations, and the total molecular weight is preferably within the preferred embodiments plus the formula weight of the halogen.

The quantity of chain extender employed in the production of the viscosity modifier is preferably such that the equivalent ratio of epoxy compound to chain extender is from about 1.5 to about 0.85, preferably from about 1.3 to about 0.9, more preferably from about 1.2 to about 0.95.

The polyoxazolidone compounds are used in accordance with the invention as viscosity modifying additives to improve the viscosity characteristics of curable thermosetting resin formulations such as epoxy-resins, in particular in the manufacture of prepregs and laminates, in particular electrical laminates. The compositions may also be used in encapsulation, coating and structural composite applications.

The thermosetting resin into which the viscosity modifier is incorporated is preferably an epoxy resin, more preferably a diglycidyl ether of bisphenol-A or a diglycidyl ether of a halogenated bisphenol-A. Other useful low-viscosity epoxy resins are glycidyl ether derivatives of 1,1,1-tris-(hydroxyphenyl)-alkanes and halogenated variations thereof. Examples of suitable epoxy resins and processes to make them are also described in H. Lee & K. Neville, *Handbook of Epoxy Resins* at 2-1 to 3-20 (McGraw-Hill Book Co. 1967) incorporated herein by reference.

The epoxy resin is generally an epoxy-terminated resin having a molecular weight of from about 200 to about 3000, and may incorporate flame-retardant groups, for example, halogen (e.g., bromine or chlorine) or phosphorous, in the resin.

In particular, the epoxy resin may be, for example, a resin derived from the reaction of a polyepoxide with a polyisocyanate, and having an molecular weight of from about 200 to about 3000 (for example, as described in U.S. Pat. No. A 5,112,932 incorporated herein by reference).

The formulation may comprise a low viscosity resin and low solvent content, as described in WO A 9,612,751 incorporated herein by reference.

The formulation may furthermore comprise styrene maleic acid anhydride copolymer as the hardener, in order to provide low dielectric constant properties, as disclosed in PCT/US98/01041 incorporated herein by reference.

The formulation may also comprise a boron-containing compound, for example boric acid or a boron oxide, as a cure inhibitor, as disclosed in GB A 0,458,502 incorporated herein by reference.

The heat-curable thermosetting resin preferably further contains a hardener (otherwise known as a "curing agent"). Suitable hardeners are multifunctional cross-linkers. Such multifunctional cross-linkers are described in numerous references, such as Vol. 6, *Encyclopedia of Poly. Sci. & Eng.*, "Epoxy Resins," at 348–56 (J. Wiley & Sons 1986) incorporated herein by reference. Multifunctional cross-linkers (as opposed to catalysts and chain extenders) preferably contain on average more than two active hydrogen moieties per molecule. For instance, the cross-linker preferably contains a plurality of secondary amine groups, one or more primary amine groups, more than 2 phenolic hydroxyl groups, a plurality of primary amide groups or more than two carboxylic acid groups.

Examples of suitable multifunctional cross-linkers known to be useful as hardeners for epoxy resins, include polyamines, polyamides, polyanhydrides, polyphenols and polyacids that contain more than two reactive sites per molecule on average. Preferred examples of multifunctional cross-linkers include dicyandiamide and polyphenols such as novolacs. Examples of other multifunctional cross-linkers which can be used include polyanhydrides as disclosed, for example, in WO A 9,411,415 (published May 26, 1994) incorporated herein by reference.

The quantity of multifunctional cross-linker is preferably from about 0.1 to about 200 parts by weight, per hundred parts by weight of the resin composition. When the multifunctional cross-linker is dicyandiamide, the formulation preferably contains from about 0.5 to about 8 parts by weight of dicyandiamide per hundred parts of the resin composition. The polyanhydrides are preferably used in an amount of from about 20 to about 100 parts, per hundred parts of the resin composition.

Epoxy resin composition according to the invention may optionally contain other additives of a generally conventional type, such as stabilizers, flame retardants, organic or inorganic fillers, pigments and wetting agents. Examples of suitable additives are described in U.S. Pat. No. A 5,066,735 and in C.A. *Epoxy Resins-Second Ed.* at 506–512 (Mercel Dekker, Inc., 1988) both incorporated herein by reference. Particular examples of additives are methyl-toluene-4-sulfonate, aluminum oxides, phosphonic acid ester (such as Amgard P45 supplied by Albright and Wilson Ltd. United Kingdom), and Talc.

A typical epoxy resin in accordance with the invention is as follows:

|  | % BY WEIGHT |
| --- | --- |
| Solvent | 0–60 |
| Pigment | 0–10 |
| Filler | 0–20 |
| Stabilizer | 0.01–2 |
| Hardener | 0.1–60 |
| Catalyst | 0.01–5 |
| Chain extender | 0–50 |
| Viscosity modifier | 0.5–40 |
| Epoxy resin | 20–99 |

The formulations previously described may be used to make prepregs and electrical laminates. The formulations advance quickly and controllably during B-staging to avoid drip, and cure to provide good laminates in the laminating step.

Such formulations can be stored for long periods without loss of stability.

Preferred embodiments of the invention are illustrated in the following specific Examples.

Preparation 1—Preparation of Viscosity Modifier
General Production Procedure for Oxazolidone Ring-containing Polyepoxy/polyisocyanate Copolymer Viscosity Modifier:

An epoxy resin (D.E.R. 330) was heated to 100° C. under nitrogen purge in a 1-liter flange-top glass reactor equipped with an electrically driven mechanical stirrer, air and nitrogen inlets, sample port, condenser and thermocouple 1500 ppm based on the total solids (epoxy plus isocyanate) of a reaction catalyst (1,8-diazabicyclo[5.4.0] undec-7-en, a commercial product obtainable from Anchor under the trademark AMICURE DBU-E) was added and the mixture was heated to 150° C. (for MDI) or 180° C. (for TDI)

An isocyanate (as described in Table 1) was charged into the epoxy resin via an additional funnel portionwise within a period of 5–240 minutes.

The heat of reaction caused the reaction temperature to rise to at least 190° C.–210° C. The reaction temperature was maintained between 200° C. and 205° C. until all the isocyanate was added. After addition was complete, the reaction mixture was kept at 200° C. for 5–60 min. until the theoretical epoxy equivalent weight (EEW) was reached. The solid resin was diluted with DMF to 50–55 wt % solid solution and cooled to room temperature.

Preparation 2

General Production Procedure for Viscosity Modifier Incorporating Chain Extender Epoxy/isocyanate copolymers produced in accordance with Preparation 1 were introduced as a charge into a 1-liter flange-top glass reactor equipped with an electrically driven mechanical stirrer, air and nitrogen inlets, sample port, condenser and thermocouple.

The chain extender (tetrabromobisphenol-A, Bisphenol-A, or monoethanolamine) was added to the epoxy/MDI copolymer solution and additional solvent was added to make a 35 wt % solid solution.

When a bisphenol chain extender was used, an additional advancement catalyst (triphenylethyl phosphonium acetate) was added to the solution. The reaction mixture was heated to 120° C.–135° C. The temperature of the reaction mixture was maintained in this range over a period of 2–24 hours until the epoxy content of the extended on solid was lower than 1%.

When an amine chain extender was used, the reaction temperature was between 60° C.–100° C. and no additional catalyst was needed.

The reaction mixture was cooled to room temperature, and additional solvent was added to adjust the solid content to 30 wt %.

EXAMPLES 1 TO 6

Polyoxazolidone compositions were prepared, using the general preparation method 1 outlined above, and the ingredients and amounts set out in Table 1.

The following analytical methods are used for various measurements in the examples.

The standard wet titration method was used to determine Epoxy Equivalent Weight (EEW).

Reactivity of the resins was measured according to the following method: The resin solution was blended with catalyst and hardened in amounts as shown in Table 3 and Table 9. The mixture was then reacted on the surface of a hot plate, and reactivity was reported as elapsed time required for gelation.

The glass transition temperature of the resin was measured by DSC at 10° C./min, from 0 to 150° C.

The melt viscosity was measured according to the ASTM D445 method using an ICI cone and plate viscometer.

Weight average molecular weight ($M_w$) was measured by GPC using DMF as solvent.

Physical properties of the compositions are also shown in Table 1.

TABLE 1

| COMPOSITION | Example No | | | | | | Comparative Example 1 | Comparative Example 2 |
| --- | --- | --- | --- | --- | --- | --- | --- | --- |
| | 1 | 2 | 3 | 4 | 5 | 6 | | |
| EPOXY RESIN A | 70 | 67 | 69 | 69.5 | 69.5 | 78 | 81 | PKHH from Phenoxy Associate co. |
| ISOCYANATE A | 30 | 33 | | 30.5 | 30.5 | | | |
| ISOCYANATE B | | | 31 | | | | | |
| ISOCYANATE C | | | | | | 22 | 19 | |
| DBU, ppm | 1500 | 1000 | 1500 | 1500 | 1500 | 2000 | 2000 | |
| RESIN CHARACTERISTICS | | | | | | | | |
| EEW | | 858 | 716 | 721 | 700 | 600 | 435 | >10000 |
| MELT VISCOSITY @ 200° C., Pa · s | | 43.7 | 7.68 | 8.0 | 7.04 | 4.8 | 0.53 | Not measureable |
| Tg, ° C. | 93 | 112 | 91 | 96 | 90 | 86 | 60 | 95 |
| Mw | 5994 | 9714 | 7121 | 7821 | 6101 | 7596 | 4564 | 59487 |

Epoxy Resin A is a diglycidyl ether of bisphenol-A having an epoxy equivalent weight between 177 and 189 sold by The Dow Chemical Company under the trademark D.E.R. 330.
ISOCYANATE A is a mixture of 50/50 wt % of 2,4'- and 4,4'-methylenebis(phenyisocyanate), sold by The Dow Chemical Company under the trademark XZ95263.00
ISOCYANATE B is 4,4'-methylenebis(phenyisocyanate), sold by The Dow Chemical Company under the trademark ISONATE M125
ISOCYANATE C is technical grade TDI (95% 2,4- and 5% 2,6-isomer) sold by Fluka, under the desaignation 89871
DBU is a catalyst for the epoxy/MDI reaction {1,8-diazabicyclo[5.4.0]undec-7-en}

Examples 1 to 6 each have a Tg of at least 86, which is generally comparable with that of PKHH.

Each of Examples 1 to 6 have a hydroxyl content which was, for practical purposes, 0. Comparative Example 1 is intended to illustrate the type of product obtained following the method disclosed in Example 6 of EP B 0,695,316, which uses TDI, in an amount of 18.7%, based on the total amount of TDI/epoxy resin (this being the highest amount of TDI suggested in the reference). It can be seen that the molecular weight of the resulting product is less than 5,000, and the melt viscosity and Tg values of the product are low. By comparison, Example 6 employs a larger amount of isocyanate (TDI) which results in a material having a higher molecular weight, and consequently a higher Tg.

EXAMPLES 7 TO 10

Advanced polyoxazolidone compositions were prepared, by reacting the polyoxazolidone compositions prepared in Examples 1, 3, 4 and 5 with various chain extenders, namely bisphenol-A, TBBA (tetrabromobisphenol-A) and monoethanolamine, using the general preparation method 2 outlined above, and the ingredients and amounts set out in Table 2. Physical properties of the compositions are also shown in Table 2.

The Tg of the resulting materials are all higher than that of PKHH.

TABLE 2

| | Example No. | | | |
|---|---|---|---|---|
| | 7 | 8 | 9 | 10 |
| COMPOSITION | | | | |
| Example 1 | 29.2 | | | |
| Example 3 | | 29.2 | | |
| Example 4 | | | 26.09 | |
| Example 5 | | | | 38.34 |
| TBBA | 10.8 | 10.8 | | |
| Bisphenol-A | | | 3.91 | |
| Monoethanolamine | | | | 1.66 |
| DMF | 60 | 60 | 70 | 60 |
| Triphenylethylacetate | 0.04 | 0.03 | 0.09 | |
| RESIN CHARACTERISTICS | | | | |
| % epoxy (on solid) | 0.67 | 0.70 | 0.65 | 0.82 |
| Tg, ° C. | 130 | 137 | 131 | 111 |
| Hydroxyl content (Equiv/100 g solids) | 0.10 | 0.10 | 0.11 | 0.14 |

FORMULATION EXAMPLES I TO IV

Epoxy resin varnish compositions were prepared using the viscosity modifiers prepared according to Examples 2 and 7 and the ingredients and amounts set out in Table 3. The various components were mixed at room temperature, using a mechanical stirrer. Physical properties of the compositions are also shown in Table 3.

Epoxy resin B is a reaction product of a commercially available liquid epoxy resin having an EEW of 180 (D.E.R. 383), tetrabromobisphenol-A (TBBA), a commercially available brominated epoxy resin having an EEW of 441 (D.E.R. 560), and a catalyst (Triphenylethyl phosphoniumacetate). The designation D.E.R. 383, D.E.R. 560, etc. are used at various points in the following description to refer to the commercial designations of various epoxy resins produced by The Dow Chemical Company.

| | |
|---|---|
| D.E.R. ™ 383 | 51.60 |
| TBBA | 22.00 |
| D.E.R. ™ 560 | 6.40 |
| catalyst | 500 ppm |
| based on solid | |
| EEW = 363 | |
| Glycol ether (Dowanol PM) | 10.00 |
| Acetone | 8.80 |
| Boric acid solution | 1.20 |
| (20 wt % in methanol) | |
| TOTAL | 100.00 |

Stroke cure reactivity at 170° C. was measured by stroking the formulation onto a hotplate at 170° C., and measuring the time taken for the composition to gel.

TABLE 3

| | Weight ratio of components (based on solids) | | | |
|---|---|---|---|---|
| EPOXY RESIN FORMULATION | Formulation I (comparative - no viscosity modifier) | Formulation II (comparative - PKHH as viscosity modifier) | Formulation III (Example of invention) | Formulation IV (Example of invention) |
| Epoxy resin B | 100.00 | 100.00 | 100.00 | 100.00 |
| DICYANDIAMIDE [10% solid in DOWANOL PM ™/DMF] | 3.00 | 3.00 | 3.00 | 3.00 |
| Tetraphenolethane (TPE) (SD-357B) Soln. [50% in MEK] (Borden Chemicals) | 0.80 | 0.80 | 0.80 | 0.80 |
| Glycidyl ether of TPE (EPON 1031 ™). [69.7% Solid in Acetone] | 2.00 | 2.00 | 2.00 | 2.00 |
| PKHH* Resin Soln. (40% in Dowanol PMA ™) | | 3.00 | | |
| Material of Example 7 (40% solid in DMF) | | | 3.00 | |
| Material of Example 2 (50% solid in DMF) | | | | 3.00 |
| 2-PHENYLIMIDAZOL | 0.47 | 0.47 | 0.47 | 0.47 |
| (20% solid in methanol) | | | | |
| TOTAL (on a solids basis) | 106.27 | 109.27 | 109.27 | 109.27 |
| MEK Solvent to make up 60.0% sol. | | | | |
| Stroke Cure Reactivity 170° C. (sec) | 265–269 | 267–271 | 269–273 | 277–281 |

NB, Components of formulations I to IV are given on a solids basis

Preparation of Prepregs

Prepregs were prepared from formulation Examples I to IV by dipping, using a substrate of glass cloth (Type 7628 from Porcher Textile, Badinieres, Fr-38300 Bourgoin-Jallieu France, or Interglas Textil GmbH, Ulm/Donau, Germany). The impregnated substrates were passed through a CAR-ATSCH™ pilot treater (built by Caratsch AG, Bremgarten, Switzerland) having a 3-meter horizontal oven, at an air temperature of from 180° C. to 185° C., and a winding speed of from 1 to 2.1 m/min.

For each of formulation in Table 3, three different treater settings were employed, selected so as to produce prepregs having different residual gel times (approximately 120, 140, and 170 seconds, measured at 171° C.)

The resin content of each prepreg was measured using 10 cm ×10 cm square sheets of glass cloth before and after prepreg production, according to Method IPC-L-109B, IPC-TM-650:2.3.16 (available from the Institute for Interconnecting and Packaging Electronic Circuits, Lincolnwood, Ill., USA). Results appear in Tables 4 to 7.

TABLE 4

Formulation Example I (Comparative)

| Settings | A2 | A5 | A6 |
|---|---|---|---|
| Oil (° C.) | 240 | | |
| Set Temp (° C.) | 185 | | |
| Air Temp (° C.) | 180 | | |
| Gap | 48 | 44 | 46 |
| Winding Speed (m/min) | 1.3 | 1.55 | 1.1 |
| Resin content (wt %) | 42 | 41 | 43.9 |
| Gel-time (sec) | 142 | 175 | 126 |
| MIL Flow (%) | 20.0 | 21.0 | 20.3 |
| Minimum Viscosity @ 140° C. (Pa.sec) | 20.48 | 5.12 | 27.52 |

TABLE 5

Formulation Example II (Comparative)

| Settings | B3 | B5 | B6 |
|---|---|---|---|
| Oil (° C.) | 240 | | |
| Set Temp (° C.) | 185 | | |
| Air Temp (° C.) | 183.5 | 181.9 | 182.0 |
| Gap | 45 | 44 | 45 |
| Winding Speed (m/min) | 1.59 | 1.9 | 1.7 |
| Resin content (wt %) | 41.6 | 41.5 | 43.3 |
| Gel-time (sec) | 117 | 167 | 147 |
| MIL Flow (%) | 17.8 | 20.1 | 22.9 |
| Minimum Viscosity @ 140° C. (Pa.sec) | 41.6 | 12.64 | 21.28 |

TABLE 6

Formulation Example III (Invention)

| Settings | D2 | D3 | D4 |
|---|---|---|---|
| Oil (° C.) | 240 | | |
| Set Temp (° C.) | 185 | | |
| Air Temp (° C.) | 183 | | |
| Gap | 45 | 44 | 42 |
| Winding Speed (m/min) | 1.5 | 1.75 | 2.1 |
| Resin content (wt %) | 42.8 | 42.5 | 41.1 |
| Gel-time (sec) | 124 | 143 | 169 |
| MIL Flow (%) | 22.1 | 25.0 | 22.5 |
| Minimum Viscosity @ 140 ° C. (Pa.sec) | 34.08 | 18.24 | 9.44 |

TABLE 7

Formulation Example IV (Invention)

| Settings | E2 | E3 | E6 |
|---|---|---|---|
| Oil (° C.) | 240 | | |
| Set Temp (° C.) | 183 | | |
| Air Temp (° C.) | 179.4 | | |
| Gap | 58 | 57 | 54 |
| Winding Speed (m/min) | 1.5 | 1.75 | 1.3 |
| Resin content (wt %) | 44.2 | 47.8 | 46.1 |
| Gel-time (sec) | 157 | 174 | 114 |
| MIL Flow (%) | 26.1 | 31.0 | 25.0 |
| Minimum Viscosity @ 140° C. (Pa.sec) | 19.52 | 10.56 | 51.84 |

The viscosity of the B-staged materials was plotted against time on a constant rising temperature scale of 1.5° C./min, over a temperature of from 80° C. to 180° C. The resulting curves are shown as FIGS. 1 to 3 (with gel times of approximately 120, 150, and 170 seconds, respectively).

Figure 2:
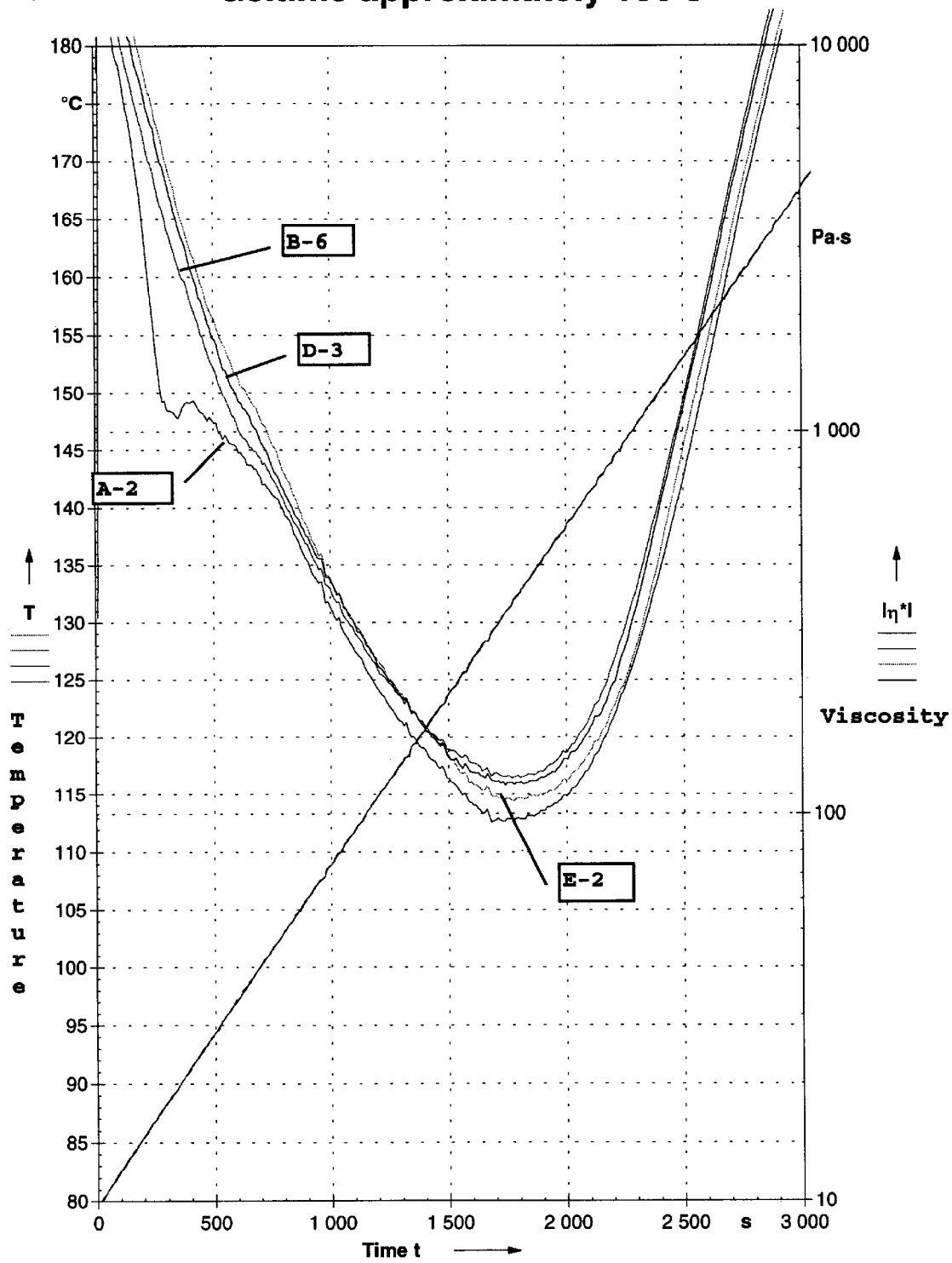
Figure 3:
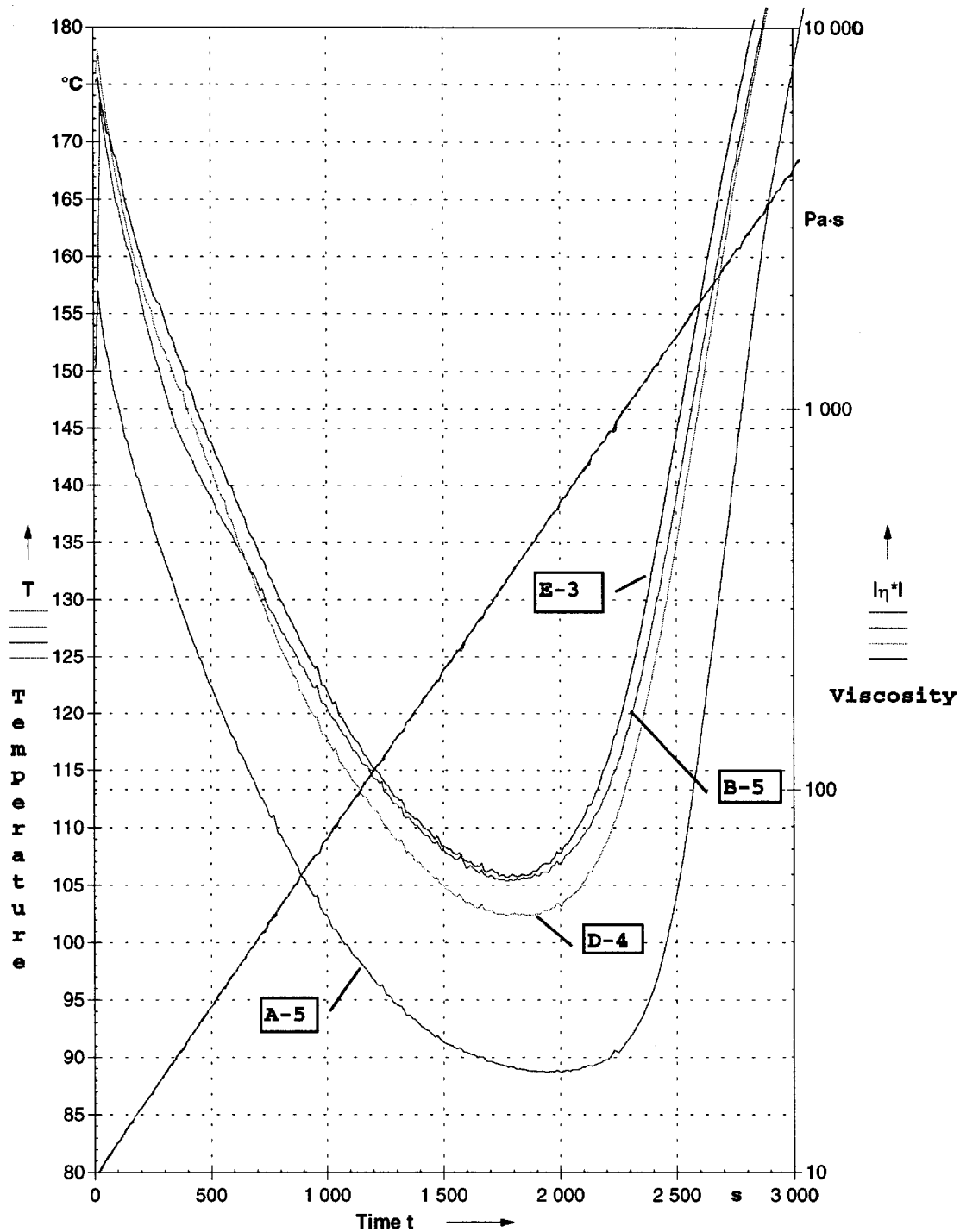

FIGS. 1 to 3 demonstrate that the Examples according to the invention have a viscosity which is significantly better (for an equivalent gel time) than that of compositions containing no flow modifier, (Formulation I), and at least as good as that of a formulation containing PKHH (Formulation II).

Preparation of Laminates

Eight sheets of each prepreg were laid-up in alternating layers with sheets of copper foil, according to the following press cycle. The laid-up prepregs were cured according to the following temperature profile, using the pressures shown in Tables 8 to 11:

| | | |
|---|---|---|
| Start Temp: | 40° C. | |
| Plateau Temp: | 180° C. | |
| Heat up ramp duration | 70 min | |
| Plateau Time: | 40 min | |
| Cooling to RT time | 50 min | |
| Vacuum duration | 30 min | |
| Low Pressure | 40°–110° C. | (25 KN/ 900 cm²) |
| High Pressure | 110°–end | (40 KN/ 900 cm²) |

The following tests were performed on each cured laminate:
(a) N-methylpyrrolidone (NMP) pick-up was measured by weighing a 5 cm×5 cm sheet of laminate, immersing it in NMP at 23° C. for 30 minutes, and then reweighing. The results are expressed as a percent gain.
(b) Laminate glass-transition temperature was measured using a differential scanning calorimeter (DSC), scanning from 50° C. to 220° C. at 10° C. per minute. The results are expressed in ° C. The same laminate sample was run twice, to obtain Tg I and Tg II.

(c) Water resistance was measured by putting the laminates in a pressure cooker for 120 minutes according to Method IPC-A-600, IPC-MI-660 and IPC-TM-650:2.6.16. All laminates passed the test with 100 percent. Water pick-up was measured.

(d) T-260 was measured as the time in minutes when the laminate started to decompose, when heated to 260° C.

TABLE 8

|  | Laminate 1 | Laminate 2 | Laminate 3 | Laminate 4 |
|---|---|---|---|---|
| Prepreg setting (see tables 4–7) | A6 | B3 | D2 | E6 |
| Laminate Properties |  |  |  |  |
| Tg I/II ° C. (fresh prepreg) | 147/145 | 144/143 | 148/146 | 149/147 |
| Tg I/II ° C. (prepreg aged 45 days at room temp) | 145/143 | 141/140 | 146/144 | 147/144 |
| Water pick-up, (wt %) | 0.47 | 0.48 | 0.47 | 0.49 |
| NMP pick-up (wt %) | 0.15 | 0.12 | 0.15 | 0.11 |
| T-260 (min) | 25.7 | 32.5 | 27.6 | 33.8 |

Table 8 demonstrates that the compositions according to the invention show a higher Tg of the final laminate both immediately after the laminate is prepared, and after 45 day aging of the prepreg at room temperature, than corresponding laminates prepared using PKHH.

Use of Different Viscosity Modifiers in Epoxy Formulations Using Styrene/maleic Anhydide Copolymer as Curing Agent (hardener).

Compositions were prepared using styrene/maleic anhydride copolymer as an epoxy hardener, and various hydroxyl-free viscosity modifiers, as shown in Table 9. The epoxy resin C has the following composition (parts by weight):

| D.E.R. ™ 330 | 19.452 |
|---|---|
| D.E.R. ™ 560 | 25.352 |
| TBBA | 11.196 |
| TOTAL | 56.000 |

To prepare resin C, the 3 components listed above were blended at 130° C. for 1 hour, and the solids were dissolved in DOWANOL™ PMA to give a solution containing 85% solids.

The styrene/maleic anhydride copolymer was SMA 3000, available from ELF ATOCHEM.

The brominated polystyrene was a material sold as PDBS-10 (by Great Lakes).

The Brominated polyphenylene oxide was a material sold as PO-64P(by Great Lakes).

The Catalyst/inhibitor was a mixture of 2-ethyl,4-methyl imidazole and boric acid, in a weight ratio of 5:4 (20% solids in methanol).

TABLE 9

Weight ratio of components (based on solids)

|  | Formulation | | | | |
|---|---|---|---|---|---|
|  | V | VI | VII | VIII (comparative - no viscosity modifier) | IX (comparative - PKHH viscosity modifier) |
| SMA 3000 (F) ™ (50% solid in DMF) | 44.000 | 44.000 | 44.000 | 44.000 | 44.000 |
| Epoxy resin C (85% solid in DOWANOL PMA ™) | 56.000 | 56.000 | 56.000 | 56.000 | 56.000 |
| PKHH solution (30% solid in DMF) |  |  |  |  | 6.000 |
| Example 2 (50% solid in DMF) | 6.000 |  |  |  |  |
| Brominated Polystyrene (30% solid in DMF) |  | 6.000 |  |  |  |
| Brominated polyphenylene oxide [30% solid in DMF] |  |  | 6.000 |  |  |
| Catalyst/inhibitor | 0.090 | 0.090 | 0.090 | 0.090 | 0.090 |
| MEK Solvent to make up solution Containing 60.0% solids |  |  |  |  |  |
| TOTAL | 106.090 | 106.090 | 106.090 | 100.090 | 106.090 |
| Stroke Cure Reactivity 170.C (in sec.) - Day 1 | 185–189 | 194–198 | 200–204** | 184–188 | 179–185 |
| Stroke Cure Reactivity 170.C (in sec.) - Day 2 | 171–175 | 182–186 | 182–186 | 170–174 | 161–165 |
| Stroke Cure Reactivity 170.C (in sec.) - Day 3 | 167–171 | 167–171 | 180–184 | 162–166 | 147–151* |

*phase separation caused by onset of gelling.
**The formulation VII was turbid and the brominated polyphenylene oxide settled out due to low solubility of the viscosity modifier.

As can be seen from Table 9, Formulations V, VI, and VII containing viscosity modifiers with a near-zero hydroxy content all show similar gel time reduction, with no phase separation caused by onset of gelling, compared to the compositions containing no viscosity modifier.

TABLE 10

Formulation Example V

| Settings | F4 | F5 | F6 |
|---|---|---|---|
| Oil (° C.) | 226 | | |
| Set Temp (° C.) | 175 | | |
| Air Temp (° C.) | 166 | | |
| Gap | 62 | 61 | 51 |
| Winding Speed (m/min) | 0.9 | 1.0 | 1.1 |
| Resin content (wt %) | 42.1 | 39.6 | 38.3 |
| Gel-time (sec) | 6 | 34 | 51 |
| MIL Flow (%) | 3.5 | 11.5 | 14.7 |

TABLE 11

Formulation Example VI

| Settings | G1 | G2 | G3 |
|---|---|---|---|
| Oil (° C.) | 231 | | |
| Set Temp (° C.) | 175 | | |
| Air Temp (° C.) | 167 | | |
| Gap | 65 | 68 | 66 |
| Winding Speed (m/min) | 0.9 | 1.0 | 1.1 |
| Resin content (wt %) | 39.7 | 46.8 | 39.4 |
| Gel-time (sec) | 9 | 28 | 52 |
| MIL Flow (%) | 1.9 | 20.6 | 15.7 |

TABLE 12

Formulation Example VII

| Settings | H3 | H1 | H2 |
|---|---|---|---|
| Oil (° C.) | 226 | | |
| Set Temp (° C.) | 175 | | |
| Air Temp (° C.) | 166 | | |
| Gap | 60 | 60 | 61 |
| Winding Speed (m/min) | 0.9 | 1.0 | 1.1 |
| Resin content (wt %) | 43.95 | 40.7 | 41.9 |
| Gel-time (sec) | 5 | 39 | 60 |
| MIL Flow (%) | 3.4 | 10.6 | 17.2 |

TABLE 13

Formulation Example IX (Comparative)

| Settings | I2 | I4 | I5 | I6 |
|---|---|---|---|---|
| Oil (° C.) | 236 | | | |
| Set Temp (° C.) | 175 | | | |
| Air Temp (° C.) | 166 | 167 | | |
| Gap | 55 | 55 | 53.5 | 53.5 |
| Winding Speed (m/min) | 1.1 | 1.3 | 1.4 | 1.5 |
| Resin content (wt %) | 39.5 | 43.2 | 42.5 | 43.2 |
| Gel-time (sec) | 4 | 32 | 43 | 46 |
| MIL Flow (%) | 1.4 | 18.2 | 18.2 | 21.5 |

The viscosity of the B-staged materials was plotted against time on a constant rising temperature scale of 3.0° C./min, over a temperature of from 80° C. to 200° C. The resulting curves are shown as FIGS. 4 to 6 (with gel times of approximately 7, 33, and 49 seconds, respectively).

Figure 4:
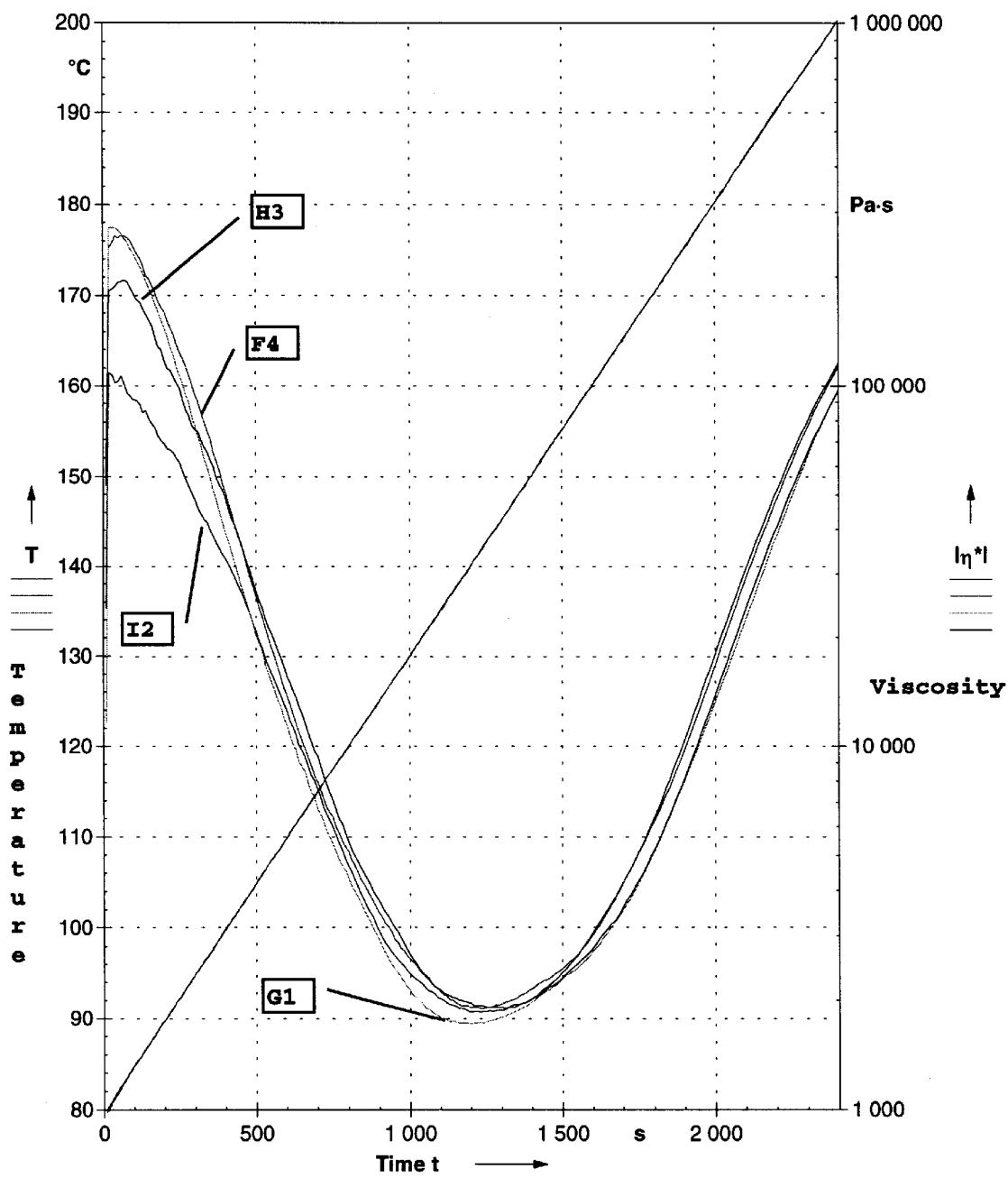
Figure 5:
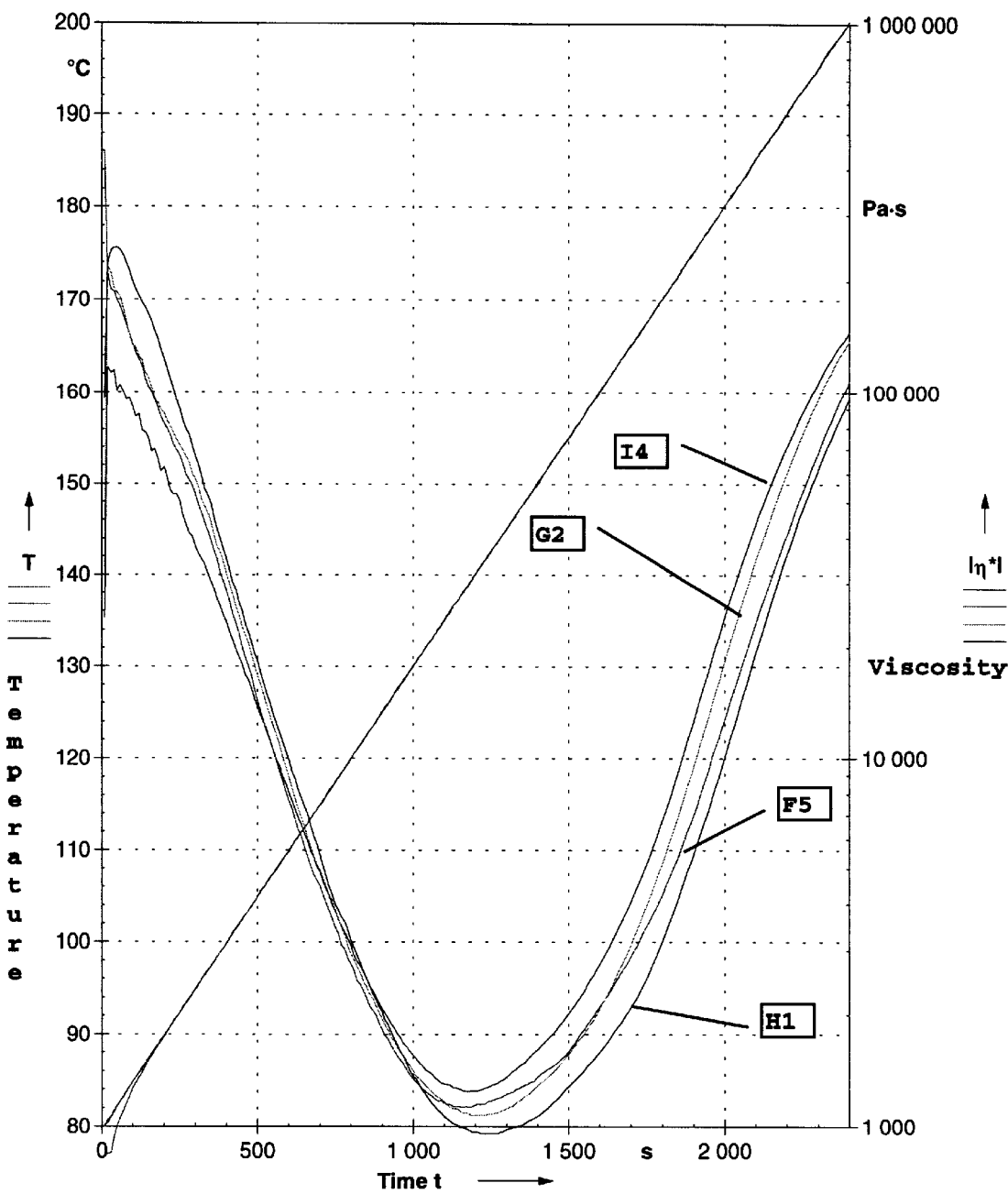
Figure 6:
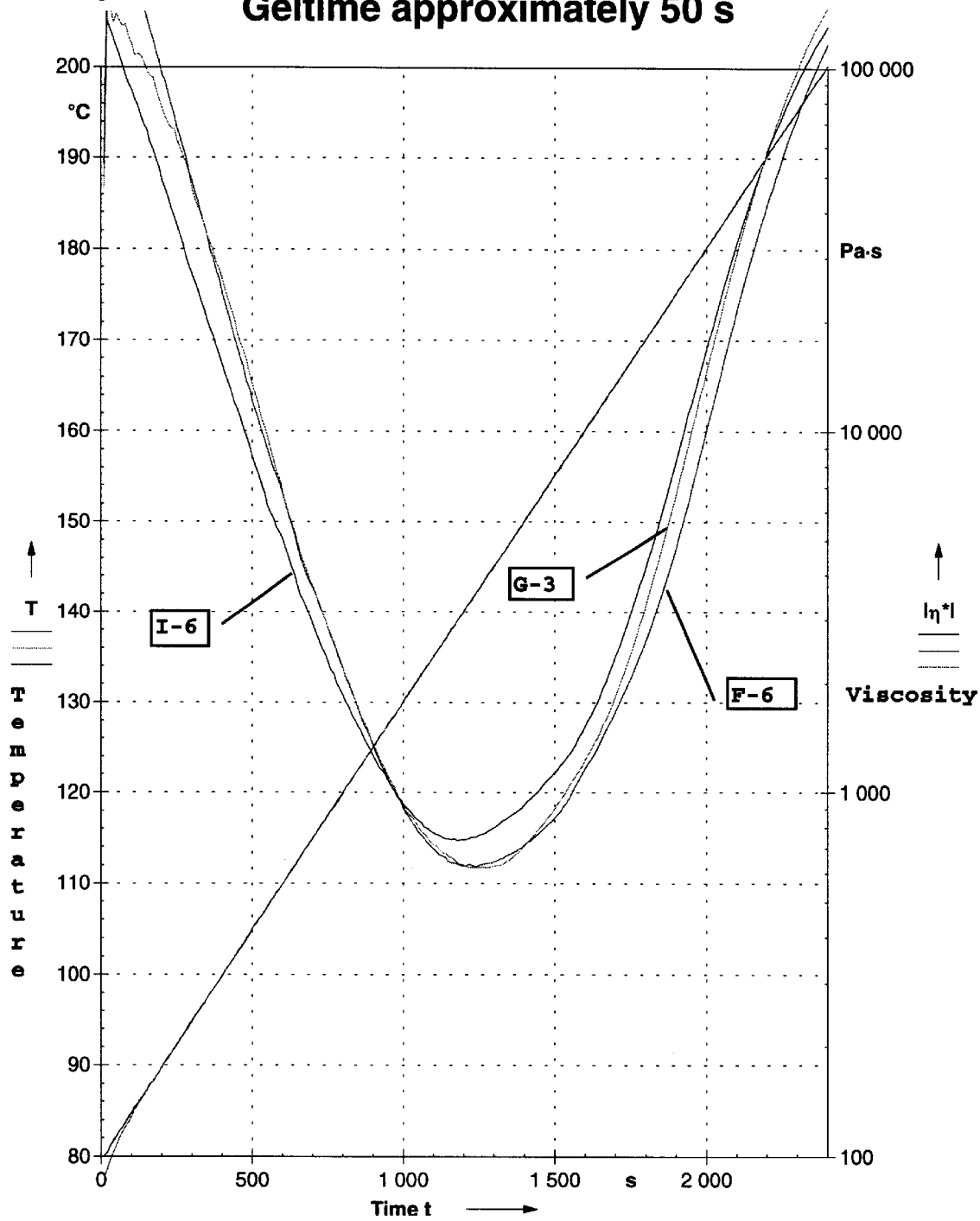

FIGS. 4 to 6 demonstrate that the Examples according to the invention have a viscosity at least as good as that of a formulation containing PKHH (Formulation IX).

Preparation of Laminates

Eight sheets of each prepreg were laid-up in alternating layers with sheets of copper foil, according to the following press cycle. The laid-up prepregs were cured according to the following temperature profile, using the pressures shown in Tables 8 to 11:

| | |
|---|---|
| Start Temp: | 40° C. |
| Plateau Temp: | 200° C. |
| Heat up ramp rate0 | 3° C./min |
| Plateau Time: | 90 min |
| Cooling to RT time | 50 min |
| Vacuum duration | 30 min |
| Pressure | 120 KN/ 900 cm square |

The standard copper foils NT-TW and the commercially available treated copper foil NTTWS were obtained from Circuit foils, 35 µm thickness grade and the peel strength was measured by IPC method TM-650 Number 2.4.8° C.

TABLE 14

| | Laminate 5 | Laminate 6 | Laminate 7 | Laminate 8 |
|---|---|---|---|---|
| Prepreg setting (see Tables 10–13) | F5 | G2 | H1 | I5 |
| Laminate Properties | | | | |
| Tg I/II ° C. (fresh prepreg) | 183/185 | 182/187 | 181/184 | 180/182 |
| Water pick-up, wt % | 0.19 | 0.21 | 0.21 | 0.21 |
| Standard Copper (NT-TW) peel Strength N/cm | 12.3 | 12.4 | 12.3 | 11.6 |
| Treated Copper (NTTWS) peel strength, N/cm | 15.4 | 13.4 | 15.1 | 16.2 |

EXAMPLE 11

A polyoxazolidone viscosity modifier composition was prepared using the general preparation method 1 outlined above with the following ingredients: 68 weight percent epoxy resin A, 32 weight percent isocyanate A, and 1500 ppm DBU. The resulting modifier resin had an EEW of 780 and a melt viscosity of 34 Pa·s at 200° C.

An epoxy resin varnish composition according to the present invention using the above viscosity modifier and a comparative epoxy resin varnish without the viscosity modifier, were prepared using the procedure as outlined for Formulation Examples I to IV except that the base thermosetting resin used was D.E.R. 592A80. D.E.R. 592A80 is a resin based on epoxy-terminated polyoxazolidone resin and is commercially available from The Dow Chemical Company. The ingredients and amounts of the varnishes are set out in Table 15 below. The varnishes were prepared by blending the various components at room temperature using a mechanical stirrer. The stroke cure reactivity of each of the varnishes are also shown in Table 15.

Prepregs from the above described varnishes were prepared and the gel time of each were measured according to the procedure described above for Formulation Examples I to IV except that the prepregs were pressed at 190° C. in 90 minutes under a pressure of 150 KN/900 square cm. The gel time of the prepregs are shown in Table 15.

Laminates were prepared from the above prepregs according the procedure described above for Formulation Examples I to IV except that the following temperature profile was used:

| | |
|---|---|
| Start temperature: | 40° C. |
| Plateau temperature: | 190° C. |
| Heat up ramp duration | 45 minutes |
| Plateau time | 90 minutes |
| Cooling to RT time | 50 minutes |
| Vacuum duration | 30 minutes |
| Pressure | 150 KN/900 cm$^2$ |

The Tg of the laminates was measured and is shown in Table 15.

TABLE 15

| | Comparative Example A | Example 11 (Example of the Invention) |
|---|---|---|
| Bare Thermosetting Resin D.E.R. 592A80 | 100 part solid | 100 part solid |
| Viscosity modifier, (phr), (based on solid) | 0 | 3 |
| Boric acid, (phr) (20 wt % in methenol solution) | 0.4 (solid) | 0.4 (solid) |
| Catalyst, 2-ethyl, 4-methyl imidizole (phr) | 0.6 (2E4MI) | 0.6 (2E4MI) |
| Dicy, (phr) (10% solid in Dowanol PM/DMF) | 2.8 (solid) | 2.8 (solid) |
| Varnish Gel time @ 170° C., (seconds) | 218 | 241 |
| Treater Setting | | |
| Oven air temperature, ° C. | 183 | 184 |
| Treater speed, m/min | 1.5 | 1.6 |
| Resin content, wt % | 44 | 45.4 |
| Prepreg Gel time measured @ 171° C., (seconds) | 94 | 118 |
| Minimum melt viscosity, measured @ 140° C. (class) | 79 | 85 |
| Laminate Tg; (° C.) | 176 | 174 |

The evaluation results described above in Table 15 shows that it is possible to achieve a longer gel time for both varnish and prepreg prepared using the viscosity modifier of the present invention, and achieve a higher B-staged material melt viscosity while maintaining high laminate Tg.

What is claimed is:

1. A thermosetting resin composition comprising a heat-curable thermosetting resin having a molecular weight of from about 200 to about 3000, and from about 0.5 to about 40 percent by weight, based on the resin composition, of a viscosity modifier which is a thermoplastic resin having a molecular weight of at least about 5000 and a hydroxyl content not exceeding about 0.2 hydroxyl equivalents per 100 g of the resin composition, said viscosity modifier used as a viscosity modifying additive to control the viscosity characteristics and flow characteristics of the heat-curable thermosetting resin while maintaining an adequate Tg in a final cured resin resulting from curing the heat-curable thermosetting resin; wherein the viscosity modifier is an oxazolidone ring-containing compound having a Tg of at least 86° C. which is the reaction product of:
   a) a polyisocyanate having an isocyanate functionality of from about 1.9 to about 2.1;
   b) a polyepoxide having an epoxide functionality of from about 1.9 to about 2.1; and optionally,
   c) a chain extender.

2. A thermosetting resin composition as claimed in claim 1, wherein the said viscosity modifier composition comprises an oxazolidone ring-containing compound having a molecular weight of at least about 5000, which is the reaction product of:
   a) from about 20 to about 43 weight percent, based on the polyepoxide and polyisocyanate reactants, of a polyisocyanate having an isocyanate functionality of from about 1.9 to about 2.1;
   b) from about 80 to about 57 weight percent, based on the polyepoxide and polyisocyanate reactants, of a polyepoxide having an epoxide functionality of from about 1.9 to about 2.1; and optionally,
   c) a chain extender, in an amount such as to provide from about 0.01 to less than about 0.5 equivalents of oxazolidone, per kilogram of the thermosetting resin composition.

3. A thermosetting resin composition as claimed in claim 2, wherein the said viscosity modifier is in an amount such as to provide from about 0.05 to about 0.25 equivalents of oxazolidone, per kilogram of the thermosetting resin composition.

4. A process for preparing a prepreg, which process comprises impregnating a reinforcing web with an epoxy resin composition, a hardener for the epoxy resin and an organic solvent, and heating the web to a temperature sufficient to partially react the epoxy resin with the hardener, characterized in that the epoxy resin composition is a resin composition as claimed in claim 1.

5. A process for preparing an electrical laminate which process comprises laminating at least one layer of a prepreg prepared by a method as defined in claim 4 with electrically conductive material and heating the so prepared laminate to cure the epoxy resin.

6. A resin composition as claimed in claim 1, wherein the polyisocyanate is 2,4'-methylene-bis(phenyl-isocyanate) 4,4'-methylene-bis(phenylisocyanate), polymeric MDI or toluene diisocyanate, or a mixture of two or more thereof.

7. A resin composition as claimed in claim 1, wherein the polyisocyanate compound is employed in an amount of from about 15 to about 43 weight percent, based on the polyepoxide and polyisocyanate reactants.

8. A resin composition as claimed in claim 7, wherein the polyisocyanate compound is employed in an amount of from about 20 to about 40 weight percent, based on the polyepoxide and polyisocyanate reactants.

9. A resin composition as claimed in claim 8, wherein the polyisocyanate compound is employed in an amount of from about 25 to about 35 weight percent, based on the polyepoxide and polyisocyanate reactants.

10. A resin composition as claimed in claim 1, wherein the polyepoxide is a diglycidyl ether of a dihydric phenol or a diglycidyl ester of a dicarboxylic acid.

11. A resin composition as claimed in claim 1, wherein the polyepoxide is a diglycidyl ether of bisphenol-A, a diglycidyl ether of bisphenol-F, a brominated diglycidyl ether of bisphenol-A, a brominated diglycidyl ether of bisphenol-F or a mixture of two or more thereof.

12. A resin composition as claimed in claim 1, wherein the chain extender is a dihydric phenol, a halogenated dihydric phenol, a dicarboxylicacid, a diamine, or an alkanolamine.

13. A resin composition as claimed in claim 1, wherein the amount of-the oxazolidone ring-containing compound viscosity modifier is from about 0.5 to about percent in weight, based on the weight of the resin composition.

14. A resin composition as claimed in claim 1, wherein the oxazolidone ring-containing compound viscosity modifier is an epoxy-terminated polyoxazolidone and the amount of the epoxy-terminated polyoxazolidone is from about 0.5 to about 20 percent by weight, based on the weight of the resin composition.

15. A resin composition as claimed in claim 1, wherein the heat-curable thermosetting resin is an epoxy-terminated resin having a molecular weight of from about 200 to about 3000.

16. A resin composition as claimed in claim 15, wherein the epoxy-terminated resin has a molecular weight of from about 200 to about 1500.

17. A resin composition as claimed in claim 1, wherein the heat-curable thermosetting resin is a resin derived from the reaction of a polyepoxide with a polyisocyanate, and having an EEW of from about 200 to about 600.

18. A resin composition, as claimed in claim 1, wherein the resin composition also comprises a chain extender, in an amount of from about 0.2 to about 0.5 equivalents of chain extender per epoxy equivalent in the epoxy-terminated resin.

19. A resin composition as claimed in claim 1, wherein the heat-curable resin composition contains boric acid or a boron oxide as an inhibitor.

20. A resin composition as claimed in claim 1, wherein the composition also comprises an accelerator.

21. A resin composition as claimed in claim 1, wherein the composition also comprises a curing agent.

22. A resin composition as claimed in claim 21, wherein the curing agent is a polyamine, polyamide, polyanhydride, polyphenol, or a polyacid compound.

23. An article comprising a cured or B-staged resin composition as claimed in claim 1.

24. A method of preparing a thermosetting resin composition, which method comprises combining a heat-curable thermosetting resin having a molecular weight of from about 200 to about 3000, with from about 0.5 to about 40 percent by weight, based on the resin composition, of a viscosity modifier wherein the viscosity modifier is a thermoplastic resin having a molecular weight of at least about 5000 and a hydroxyl content not exceeding about 0.2 hydroxyl equivalents per 100 g of the resin composition, said viscosity modifier used as a viscosity modifying additive to control the viscosity characteristics and flow characteristics of the heat-curable thermosetting resin while maintaining an adequate Tg in a final cured resin resulting from curing the heat-curable thermosetting resin; wherein the viscosity modifier is an oxazolidone ring-containing compound having a Tg of at least 86° C. which is the reaction product of:
  a) a polyisocyanate having an isocyanate functionality of from about 1.9 to about 2.1;
  b) a polyepoxide having an epoxide functionality of from about 1.9 to about 2.1; and optionally,
  c) a chain extender.

25. A process for preparing a cured thermoset resin, which process comprises heating and thereby curing a thermosetting resin composition comprising a heat-curable thermosetting resin having a molecular weight of from about 200 to about 3000, and from about 0.5 to about 40 percent by weight, based on the resin composition, of a viscosity modifier which is a thermoplastic resin having a molecular weight of at least about 5000 and a hydroxyl content not exceeding about 0.2 hydroxyl equivalents per 100 g of the resin composition, said viscosity modifier used as a viscosity modifying additive to control the viscosity characteristics and flow characteristics of the heat-curable thermosetting resin while maintaining an adequate Tg in a final cured resin resulting from curing the heat-curable thermosetting resin; wherein the viscosity modifier has a Tg of at least 86° C. and is the reaction product of:
  a) a polyisocyanate having an isocyanate functionality of from about 1.9 to about 2.1;
  b) a polyepoxide having an epoxide functionality of from about 1.9 to about 2.1; and optionally,
  c) a chain extender.

* * * * *